(12) United States Patent
Heuze et al.

(10) Patent No.: US 7,469,732 B2
(45) Date of Patent: Dec. 30, 2008

(54) DEVICE DESIGNED TO PREVENT A TIRE FITTED ONTO A ONE-PIECE WHEEL RIM FROM ROLLING OFF ITS RIM, PROCESS FOR MANUFACTURING THIS DEVICE AND FITTED ASSEMBLY INCORPORATING IT

(75) Inventors: Olivier Heuze, L'Isle Adam (FR); Cliff Post, Grand Island, NY (US); Joe Duffy, North Tomawanda, NY (US)

(73) Assignee: Hutchinson, Paris (FR)

( * ) Notice: Subject to any disclaimer, the term of this patent is extended or adjusted under 35 U.S.C. 154(b) by 181 days.

(21) Appl. No.: 11/260,370

(22) Filed: Oct. 28, 2005

(65) Prior Publication Data
US 2006/0096684 A1 May 11, 2006

(30) Foreign Application Priority Data
Oct. 28, 2004 (FR) .................................. 04 11512

(51) Int. Cl.
*B60C 15/06* (2006.01)
(52) U.S. Cl. ..................................... 152/381.6; 152/516
(58) Field of Classification Search .............. 152/381.5, 152/381.6, 400, 516, 520, 158
See application file for complete search history.

(56) References Cited

U.S. PATENT DOCUMENTS

| | | | | | |
|---|---|---|---|---|---|
| 1,414,052 | A | * | 4/1922 | Smith | 152/401 |
| 1,572,746 | A | * | 2/1926 | Michelin | 152/400 |
| 1,652,146 | A | * | 12/1927 | Michelin | 152/381.5 |
| 2,324,994 | A | * | 7/1943 | Hale | 152/401 |
| 2,802,507 | A | * | 8/1957 | Clark | 152/401 |
| 3,933,392 | A | * | 1/1976 | Wells | 301/95.101 |
| 3,948,305 | A | * | 4/1976 | Watts | 157/1 |
| 4,122,882 | A | * | 10/1978 | Fisher et al. | 152/381.5 |
| 4,159,730 | A | * | 7/1979 | Osada et al. | 152/158 |
| 4,177,849 | A | * | 12/1979 | Osada et al. | 152/158 |
| 4,374,535 | A | * | 2/1983 | Watts | 152/381.6 |
| 4,694,874 | A | * | 9/1987 | White | 152/381.5 |
| 5,435,368 | A | | 7/1995 | Lust | |
| 5,899,253 | A | * | 5/1999 | Marron et al. | 152/381.5 |
| 6,698,481 | B1 | * | 3/2004 | Marin | 152/381.6 |
| 7,040,365 | B2 | * | 5/2006 | Lust | 152/381.5 |
| 2003/0160501 | A1 | | 8/2003 | Lust | |
| 2003/0188817 | A1 | | 10/2003 | Yukawa et al. | |
| 2005/0076983 | A1 | * | 4/2005 | Kimura et al. | 152/158 |

FOREIGN PATENT DOCUMENTS

| | | |
|---|---|---|
| FR | 2358283 | 2/1978 |
| FR | 2396664 | 2/1979 |
| JP | 53-36803 | * 5/1978 |

* cited by examiner

*Primary Examiner*—Russell D Stormer
(74) *Attorney, Agent, or Firm*—Clark & Brody (57) ABSTRACT

A device is fitted into a well of a one-piece wheel rim so as to prevent a tire fitted onto the rim from rolling off this rim. A process for manufacturing this device is disclosed as is a fitted assembly for a motor vehicle comprising the rim, the cover and the device. The device has a belt having two ends and a catching blocks for connecting the ends together, which is intended to clamp the belt of annular shape around the rim well, and this device is such that the belt includes a plurality of filling elements, spaced apart between the ends, which elements are designed to at least partly fill the well and are connected together via at least one flexible linking element intended to form an annular sector around the well.

22 Claims, 7 Drawing Sheets

DEVICE DESIGNED TO PREVENT A TIRE FITTED ONTO A ONE-PIECE WHEEL RIM FROM ROLLING OFF ITS RIM, PROCESS FOR MANUFACTURING THIS DEVICE AND FITTED ASSEMBLY INCORPORATING IT

The present invention relates to a device designed to be fitted into a well of a one-piece wheel rim so as to prevent a tire fitted onto the rim from rolling off this rim, to a process for manufacturing this device and to a fitted assembly for a motor vehicle comprising the rim, the tire and the device.

As is known, a one-piece wheel rim necessarily has a circumferential rim well for fitting the beads of a tire onto two, axially internal and external, seats of the rim, which terminate respectively in flanges of the rim. The tire is usually fitted onto the rim by positioning, one after the other, the beads of the tire around the rim over the top of one of the rim flanges, thanks to the rim well, and then inflating the tire so as to press the beads onto the rim seats and against the rim flanges.

It is known that the tire can roll off the rim during driving, especially when the inflation pressure inside the fitted assembly drops and/or when a transverse force is applied to the tire, for example that due to the centrifugal force when cornering at high speed. In this case, a circumferential region of one of the beads, typically the bead closest to the rim well in the usual case of an unsymmetric rim, leaves its seat owing to the forces exerted so as to come into the rim well, which makes the diametrically opposite region of the same bead pass over the top of the adjacent rim flange, causing the tire to roll off it.

It has been sought in the past to fill the rim well so as to prevent the tire from rolling off the rim in such a way.

Patent document U.S. Pat. No. 5,435,368 discloses a ring-shaped device for filling the well of a one-piece drop-center wheel rim, which device comprises, on the one hand, a plurality of circularly arcuate flexible hollow segments that are placed end to end around an annular band open at its ends and passing through these segments and, on the other hand, a means of connecting these ends in order to tighten the device around the rim well.

The segments are brought end to end in such a manner that the lateral edges of two consecutive segments are offset transversely, and the band passing through them has a radially internal face in the form of a "V" which is designed to be able to slide transversely inside the segments, so as to push the latter alternately against one or other of edges of the rim well.

A major drawback of that device, apart from its relatively high weight, lies in the complexity of its assembly and in its inside diameter, its width and its height, which are set by the sectors. This means that it is intended for equipping specifically one rim of given diameter characterized by a well of predetermined width and depth.

It is an object of the present invention to provide a device designed to be fitted into a well of a one-piece wheel rim so as to prevent a tire fitted onto the rim from rolling off this rim, the device comprising a belt having two ends and a connecting means for connecting the ends together, which means is intended to clamp the belt of annular shape around the well, allowing this drawback to be remedied.

For this purpose, a device according to the invention is such that the belt includes a plurality of filling elements, spaced apart between the ends, which elements are designed to at least partly fill the well and are connected together via at least one flexible linking element intended to form an annular sector around the well.

It will be noted that this flexible feature of the linking element(s) designed to form discontinuous annular sectors between two adjacent filling elements imparts to the device according to the invention an improved flexibility and, consequently, an easier fitting compared with the known devices, which are typically characterized by a relatively rigid continuous structure.

It should also be noted that the device according to the invention is characterized by a single connecting means for connecting the two ends of the belt together. This further facilitates the fitting of this one-piece device and minimizes its weight.

In the present description, the term "belt" should be understood to mean both a band or strip in a closed position, having an annular shape when fitted around the rim well, and this same band or strip having, in an open position (i.e. before it is fitted onto the rim), a non-annular shape.

According to another preferred feature of the invention, the or each linking element extends over the entire perimeter of the belt and terminates at the two ends.

According to a first embodiment of the invention, the or each linking element comprises a substantially inextensible textile and/or metal cable extending over the entire perimeter and terminating at the ends.

According to a second preferred embodiment of the invention, the linking element comprises a flexible band, such as a metal band, which can be deformed in a radial direction of the wheel.

According to another feature of the invention, common to the first and second embodiments, each of the filling elements is penetrated right through it by the or each linking element and is fastened to the latter, for example by mechanical catching or by adhesive bonding.

In accordance with the first embodiment according to the invention, the mechanical catching is for example of the crimping type.

In accordance with the second embodiment according to the invention, the mechanical catching is for example of the nut-and-bolt type.

According to another feature of the second embodiment of the invention, the filling elements may be respectively attached by transversely guiding them in upper slideways that are formed on supports that are integral with the flexible band.

It will be noted that the transverse guiding of the filling elements in these upper slideways is provided by a modular filling structure that can be adapted in the width and height directions (i.e. in the axial and radial directions of the rim well, respectively).

According to a preferred example of the second embodiment of the invention, the belt includes a plurality of bases which are respectively attached beneath the supports that receive the filling elements and which are designed to be fitted into the bottom of the rim well.

It will be noted that each filling element and the corresponding base make it possible to adjust the axial width and the radial height, respectively, of the belt in the well.

According to another feature of this preferred example, each base is attached beneath the corresponding support also by being transversely guided in lower slideways formed in the support.

Advantageously, each of the upper and lower slideways may then have a back-tapered trapezoidal cross section, such as a dovetail cross section, so as to form a means of mechanically catching the corresponding filling element.

According to another feature of this preferred example, each filling element and each corresponding base are both provided with positioning and retaining means that cooperate with the corresponding support so as to position and retain the filling element and the base on and beneath the support, respectively.

According to a variant of this preferred example, the belt includes several U-sections, spaced apart between the ends, which sections form the respective supports and each have a web fastened beneath the flexible band and two machined flanges that face each other, so as to define the slideways.

According to this variant, each filling element advantageously has a projection on its bottom face intended to lie facing the bottom of the rim well, this projection being designed to butt against the base of a flange of one of the sections so as to center the filling element transversely.

It will be noted that the devices with a flexible band according to the second embodiment of the invention are lighter and more flexible than the relatively rigid devices of the prior art.

It will also be noted that the devices according to the preferred example and according to the variant, both relating to the second embodiment, have the advantage of being adaptable to all widths and depths of rim well, through the attached fitting of the filling elements onto the slideway-forming supports.

According to another general feature of the invention, the filling elements may be made by choice of a plastic or elastomer material, preferably one that is relatively rigid, and still more preferably of a plastic based on at least one thermoplastic polymer, such as a 6 polyamide or a 6,6 polyamide.

In accordance with the preferred example of the second embodiment according to the invention, the supports and the bases are also made of a material of plastic or elastomer type, advantageously being made of the same material as that of the filling elements.

According to the variant of this preferred example, the aid support-forming sections are advantageously made of metal, preferably being welded onto the flexible band so as to confer satisfactory flexibility to the corresponding device.

According to another feature of the invention relating to the first embodiment, the connecting means may comprise two catching blocks in which the two respective ends or groups of ends facing the cable or cables are fastened, which catching blocks are joined together by a bolt that passes through them, the degree of tensioning of the device being regulated by a nut fitted onto the bolt against one of the blocks.

As regards the second embodiment, the connecting means includes a transverse finger that is designed to be locked reversibly onto a stop catch in the form of a bent-over tab covering the band at one of the ends of the belt and that binds together two arms mounted so as to pivot on a fixed transverse pivot pin, which pin is integral with the band on the other end of the belt, the connecting means further including a control lever mounted so as to pivot on a movable transverse pivot pin which is off-center relative to the fixed pin, in such a way that the belt is tightened or slackened, respectively, by moving the movable pin further away from or closer to the finger when pivoting the lever.

According to another preferred example of the invention relating to the second embodiment and advantageously to the variant, the connecting means comprises, on the one hand, a T-shaped rod with a threaded end, which terminates in a first transverse bar, and, on the other hand, a T-shaped sheath that is mounted coaxially around the rod and terminates in a second transverse bar designed to be at an adjustable distance from the first bar in order to tighten the belt, the bars being designed to be respectively locked against two turn-over regions of the flexible band that form the ends of the belt.

Preferably, the connecting means further includes a clamping element of the lock nut type mounted on the threaded end of the rod, against one end of the sheath, so as to define the tightening of the belt by moving the bars mutually closer together or further apart.

In addition, the connecting means may further include a tab provided with a security stop that extends from one of the ends of the flexible band and is designed to pass through an opening in the adjacent turn-over region, being elastically returned in abutment against one edge of the opening. It will be noted that this security stop prevents the belt from relaxing, should the tightening element be accidentally slackened off.

A process for manufacturing the device according to the invention essentially includes the overmolding of the filling elements or the supports, in the case of the first or second variants, onto the or each linking element.

A fitted assembly for a motor vehicle according to the invention comprises a one-piece wheel rim, a tire having two beads fitted respectively onto two axially internal and external seats of the rim, and a device as defined above which is fitted into a well in the rim so as to prevent the tire from rolling off the rim.

In the present description, "axially internal" and "axially external" refer respectively to those sides of the wheel rim that are intended to face toward the inside and toward the outside of the motor vehicle, after a fitted assembly that includes this rim has been fitted onto a vehicle.

It will be noted that the device according to the invention may completely or only partly fill the rim well over its axial width and its radial depth. Preferably, the device is designed to substantially fill the well both over its width and its depth.

Preferably, the rim is of asymmetric type, the rim well being adjacent the axially external seat.

Also preferably, the axially external seat is bounded axially by an external flange of the rim and by a circumferential hump that extends radially outward and is extended axially and radially inward by an axially external edge of the rim well, the hump being designed to prevent the bead fitted onto the axially external seat from sliding in the well.

Other features, advantages and details of the present invention will become apparent on reading the following description of several exemplary embodiments of the invention, given by way of illustration but implying no limitation, the description being with reference to the appended drawings in which.

Figure 1:
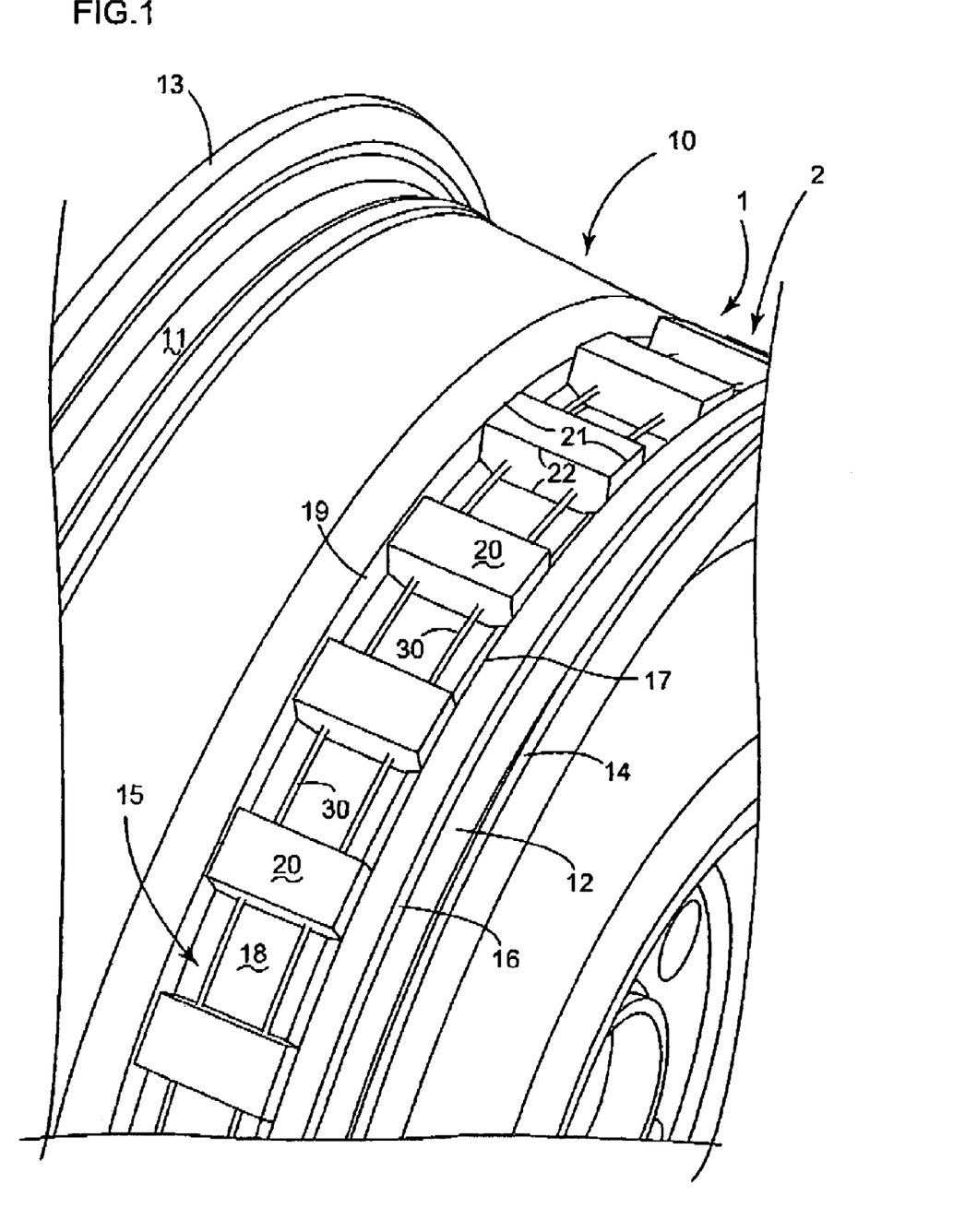
FIG. 1 is a perspective partial view of a device according to a first embodiment of the invention, mounted in a well of a one-piece wheel rim.

A device 1 according to a first embodiment of the invention is illustrated in FIG. 1 in a fitted position on a one-piece wheel rim 10.

The rim 10 has two seats, namely an axially internal seat 11 and an axially external seat 12, which are designed respectively to receive two beads of a tire (not illustrated) and which terminate in axially internal and external flanges 13 and 14. The rim 10 includes a rim well 15 between the seats 11 and 12, which is designed in a known manner so as to fit the beads of the tire onto the seats 11 and 12.

In this exemplary embodiment, the rim 10 is of the asymmetric type because the rim well 15 is formed in the immediate vicinity of the axially external seat 12. More precisely, this seat 12 is bounded axially by the external flange 14 and by a circumferential hump 16 that extends radially toward the outside and is extended axially and radially inward by an axially external edge 17 of the rim well 15, this hump 16 being designed to prevent the bead fitted onto this seat 12 from sliding in the well 15.

The device 1 comprises a belt 2 occupying, in FIG. 1, a clamping position around the well 15, which gives it an annular geometry. The belt 2 has two ends (not visible in FIG. 1), between which are placed, spaced apart, a plurality of identical filling elements 20 that are designed to substantially fill the well 15 over its width and its height and are penetrated right through them by flexible linking elements 30. The latter consist of two identical cables that extend over the entire circumference of the belt 2. The ends of the belt 2, which are formed by those of the cables 30, are joined together by a connecting means (not illustrated) that is intended to tighten the belt 2 around the well 15 to an adjustable clamping tension.

Each filling element 20 has a solid structure and, in the exemplary embodiment shown in FIG. 1, it is formed from a block with a flat or rounded base, the block being designed to substantially follow, seen in cross section, the contour of the bottom 18 of the rim well 15 and of its axially external edge 17 and axially internal edge 19. In the exemplary embodiment shown in FIG. 1, each filling element 20 is formed from a polyhedron with pairwise identical rectangular faces, and it is preferably based on a thermoplastic polymer such as a 6 polyamide or a 6,6 polyamide.

The cables 30 are designed to be substantially inextensible along the circumferential direction and are designed to be flexible in the radial direction so as to be able to form the annular sectors illustrated in FIG. 1. These cables 30 pass centrally through each filling element 20, substantially at an equal distance from the lateral and radial edges 21 and 22 thereof. Each cable 30 may be of the metal and/or textile type.

The means for connecting the two pairs of ends of the cables 30 may for example be formed from two catching blocks of reduced height, in the mass of which these two pairs of ends are respectively fastened, the catching blocks being joined together by a bolt that passes through them, the degree of tensioning of the belt 1 being adjusted via a nut mounted on the bolt against one of the blocks.

The belt 2 is manufactured by overmolding the filling elements 20 onto the two cables 30, and these elements 20 are fastened to the cables 30, advantageously by crimping metal pieces onto the cables 30 in order to fasten the elements 20 satisfactorily.

The devices illustrated in the following figures will be described below, the reference numerals being increased by 100 for each constituent of a new embodiment having a similar structure.

Figure 2:
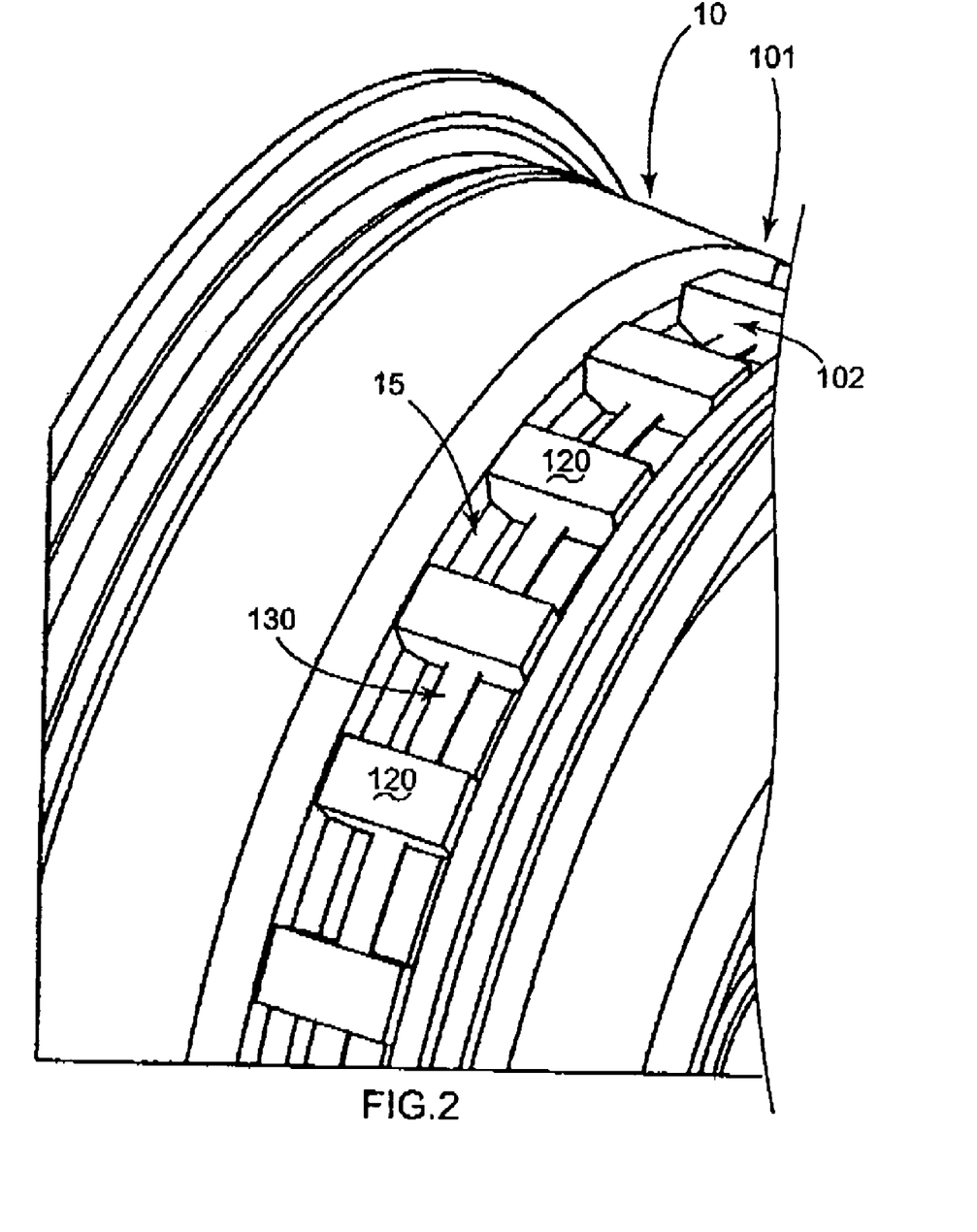
FIG. 2 is a perspective partial view of a device according to a second preferred embodiment of the invention, fitted in the rim well.
Figure 3:
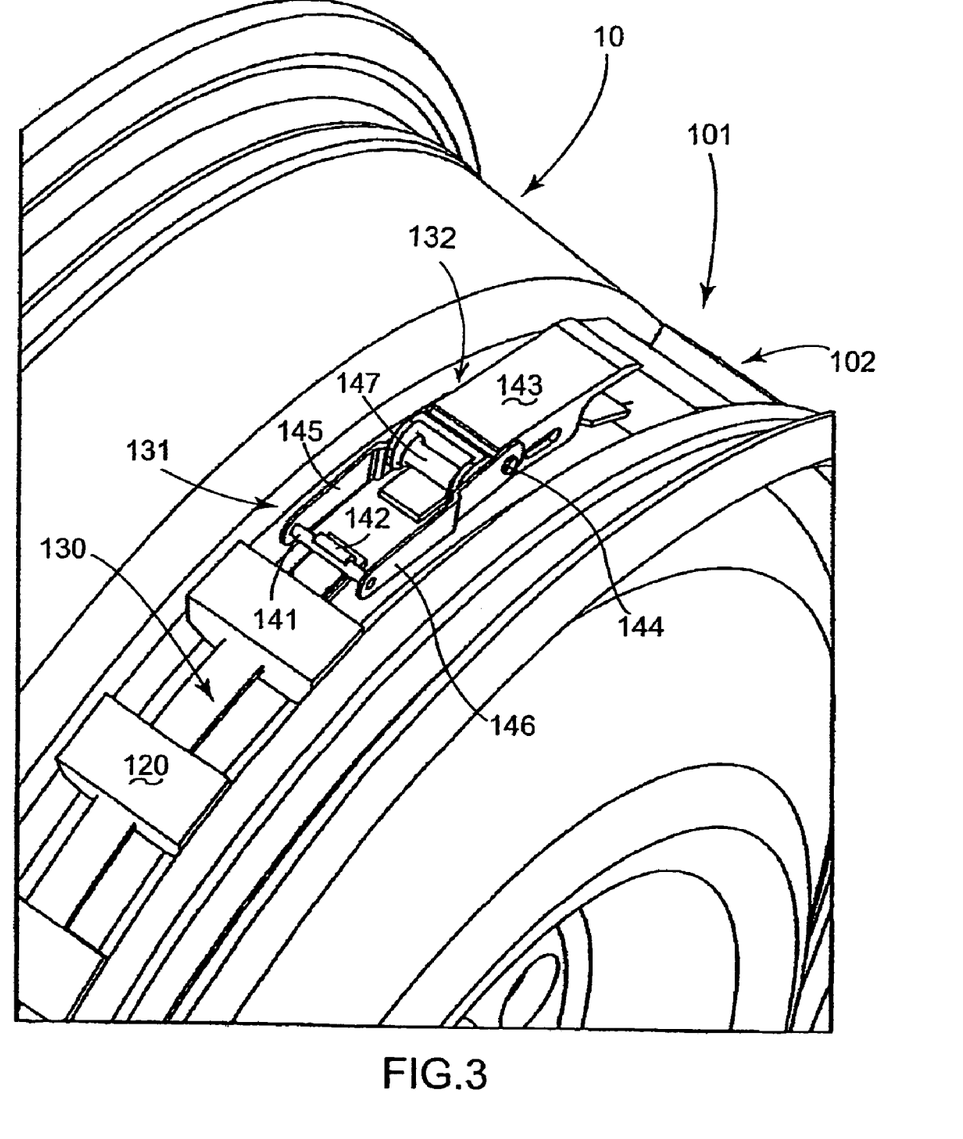
FIG. 3 is a perspective partial view of an exemplary embodiment according to the invention of a connecting means, which is illustrated in relation to the device of FIG. 2.

A device 101 according to a second embodiment of the invention is illustrated in FIGS. 2 and 3 in a fitted position on the same one-piece wheel rim 10.

As illustrated in FIG. 2, the device 101 differs from the aforementioned device 1 only by the respective structures of its single flexible linking element 130 and its connection means 140 (see FIG. 3) for connecting the ends 131 and 132 of its belt 102.

This flexible linking element 130 passes right through the filling elements 120, which are identical to the elements 20. This linking element 130 consists of a flexible metal band that extends over the entire circumference of the belt 102, so that the ends of the band 130 define those of the belt 102.

As illustrated in FIG. 3, the means 140 for connecting these ends 131 and 132 is of the clasp type, which includes a transverse finger 141 designed to be locked reversibly onto a stop catch 142 in the form of the bent-over tab covering the band 130 at one of its ends 131 and which joins together two arms 145 and 146 that are mounted so as to pivot on a fixed transverse pivot pin 144, which is integral with the band 130 at the other end 132 of the belt 102. The connecting means 140 further includes a control lever 143 mounted so as to pivot on a movable transverse pivot pin 147 that is off-center with respect to the fixed pin 144. FIG. 3 shows that the movable pivot pin 147 of the lever 143 is mounted between the finger 141 and its fixed pivot pin 147.

In operation, the belt is tightened or slackened by moving the movable pin 147 further away from or closer to the finger 141 when pivoting the lever 143.

The belt 102 is manufactured by overmolding the filling elements 120 onto the band 130, and these element 120 are locked onto the band 130, for example by mechanical catching on a bolt provided with a nut (not visible) that is mounted on each element 120 through the band 130. Thus, the locking of the elements 120 onto the band 130 may advantageously be improved in comparison with elements 120 that would be overmolded onto this band 130 without mechanical catching.

Figure 4:
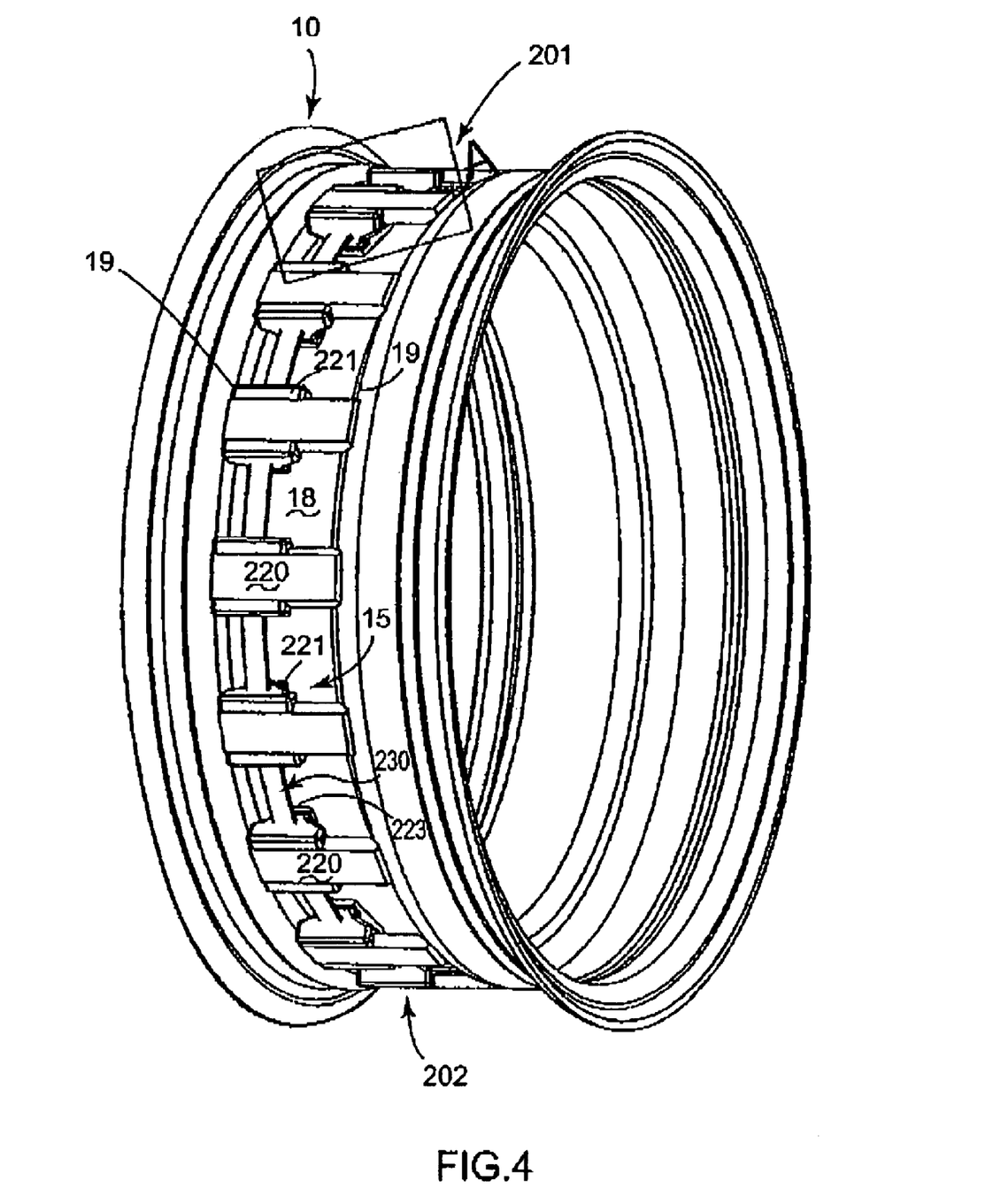
FIG. 4 is a perspective view of a device according to a preferred example of the second embodiment of the invention, fitted in the rim well.
Figure 5:
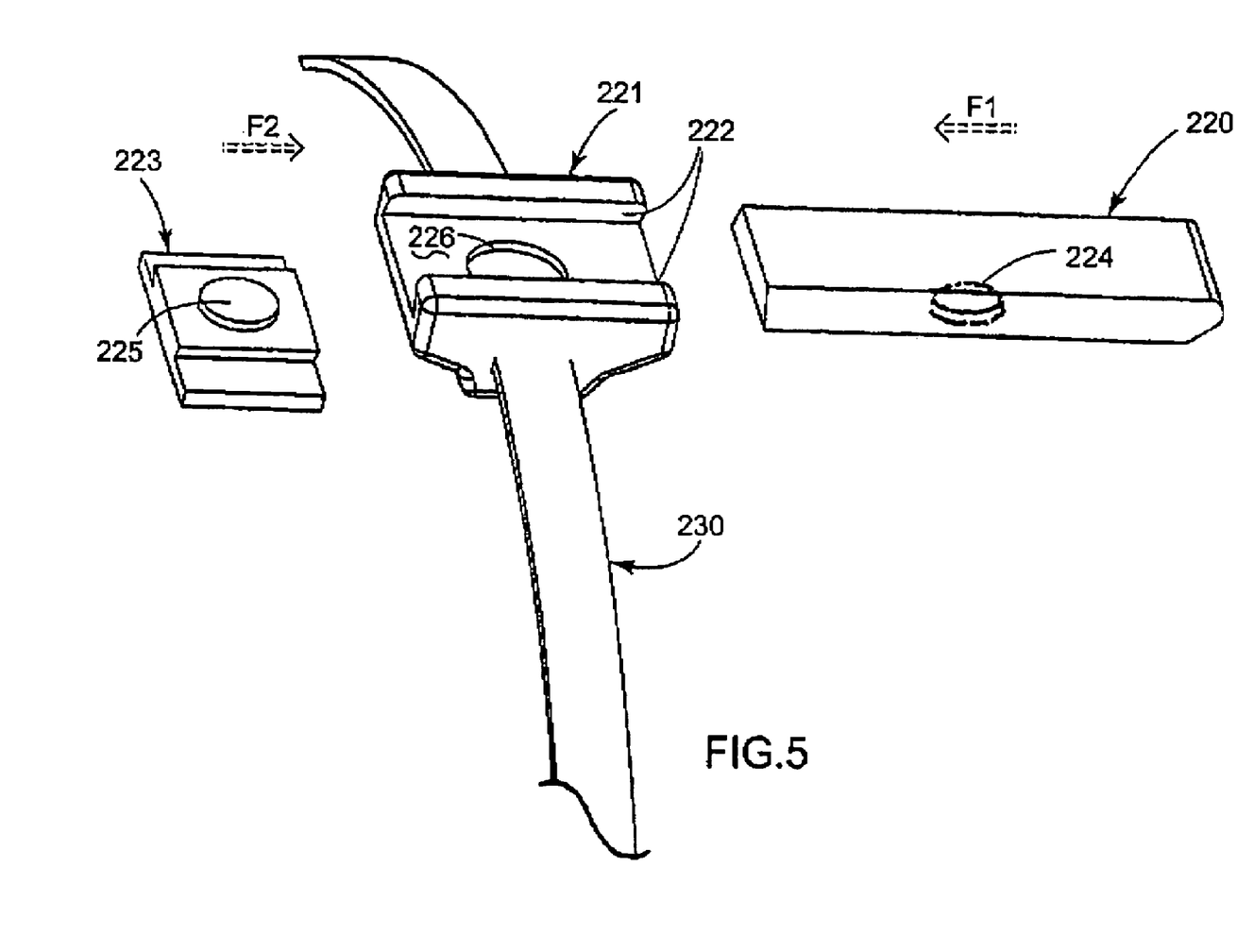
FIG. 5 is an exploded perspective partial view of detail A of the device illustrated in FIG. 4.

A device 201 according to a first variant of the second embodiment of the invention is illustrated in FIG. 4 in a position in which it is fitted onto the same one-piece wheel rim 10, and illustrated in FIG. 5 in an exploded form.

As illustrated in FIG. 5, the device 201 differs from the device 101 of FIGS. 2 and 3 only in that it has a modular structure that makes it capable of being adapted to various rim well widths and depths. The filling elements 220 that it has are respectively attached by transversely guiding them on supports 221 that form profiled upper slideways 222 (see the arrow F1 illustrating this guiding movement) so as to be able to adjust the filling of the rim well 15 along the axial width direction of the latter. Each upper slideway 222 has, in the example shown in FIG. 5, a dovetail cross section designed to radially immobilize a filling element 220 of trapezoidal cross section, which is slidingly guided in the slideway 222.

The supports 221 are made integral with a flexible metal band 230, similar to the band 130, by overmolding these supports 221 onto the band 230.

In addition, the device 201 illustrated in FIG. 5 includes a plurality of bases 223 that are respectively attached beneath the supports 221, by transversely guiding them in lower slideways (not visible) formed in these supports 221 (see the arrow F2 illustrating this guiding movement) so as to be able to adjust the filling of the rim well 15 in the radial height direction thereof. Preferably, each base is designed to be fitted onto the bottom 18 of the rim well 15 so that the radial height of the belt 202 coincides substantially with that of the edges 17 and 19 of the well 15.

Each filling element 220 and the corresponding base 223 may be respectively provided with positioning and retaining feet 224 and 225, both these cooperating with the edge of an orifice 226 formed in the corresponding support so as to position and retain the filling element 220 and the base 223 on and beneath the support 221, respectively.

The supports 221 and the bases 223 are made of a plastic, preferably the same as that of the filling elements 220.

Figure 6:
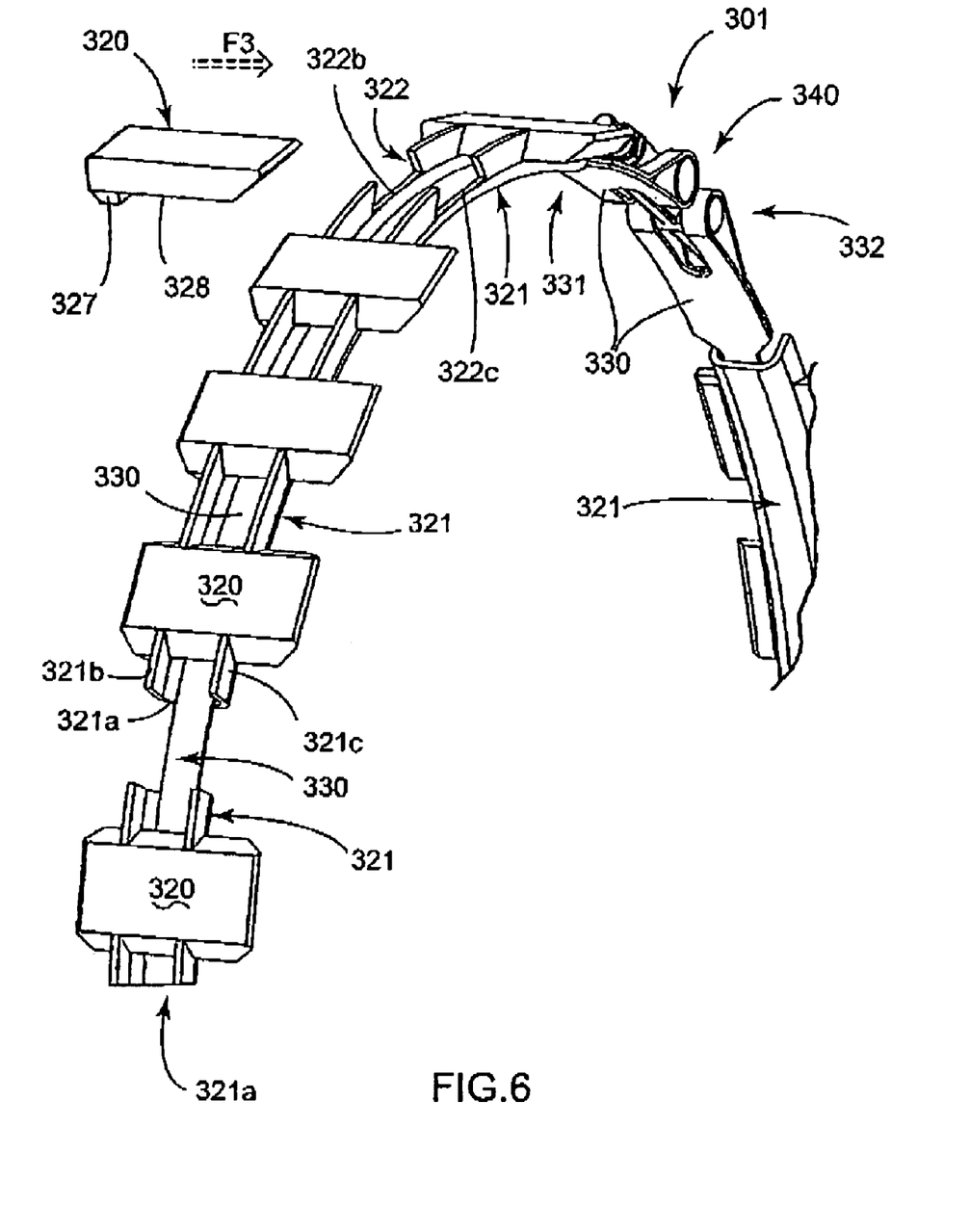
FIG. 6 is a semi-exploded perspective partial view of a variant of the device of FIG. 4, fitted in the rim well.

A device 301 according to a variant of that shown in FIGS. 4 and 5 is illustrated in FIG. 6 in a clamped closed position giving it an annular shape.

The device 301 differs from the device 201 of FIGS. 4 and 5 by the structure of the supports 321 forming the slideways 322 onto which the filling elements 320 are respectively attached, via the profile of the filling elements, which is matched to these supports 321, and via the structure of the means 340 for connecting the ends 331 and 332 of the belt 302 of this device 301.

The slideways 322 designed to receive the filling elements 320 (see the arrow F3 in FIG. 6) are formed in sections 321, for example made of metal and having a U-shaped cross section, which sections are spot-welded to the flexible band 330 so that the entire belt 302 remains flexible and are spaced apart circumferentially between the ends 331 and 332. More precisely, each section 321 has a web 321a, which is fixed beneath the flexible band 330, and two machined flanges 321b and 321c facing each other at circumferential intervals, so as to define the two transverse edges 322b and 322c of the slideways 322. Like the slideways 222 of FIGS. 4 and 5, these edges 322b and 322c have, in the example shown in FIG. 6, a dovetail cross section designed to radially immobilize a filling element 320 of trapezoidal cross section guided so as to slide in the slideway 322.

In addition, each filling element 320 has a projection 327 on its bottom face 328 intended to face the bottom 18 of the rim well 15, this projection 327 being designed to butt against the base of a flange 321b of a section 321 so as to allow the filling element 320 to be centered transversely.

It will also be noted that the devices 201, 301 according to the invention, owing to the modular structure of their belts 202, 302, which include the filling elements 220, 320 of variable dimensions attached to the supports 221, 321, may be readily adapted to rims 10 having different diameters and having different widths and depths of the rim well 15.

Figure 7:
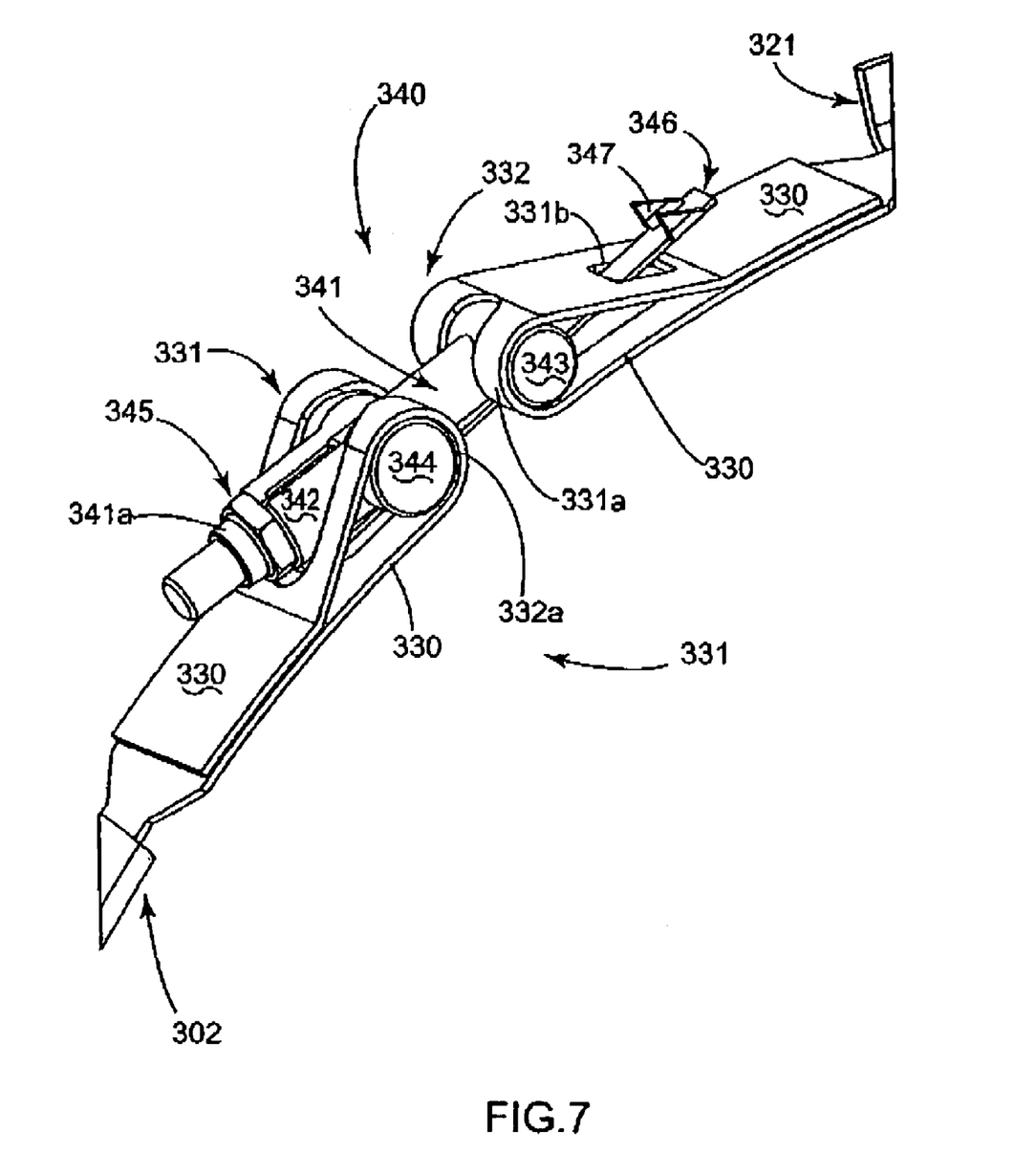
FIG. 7 is a perspective partial view of another exemplary embodiment according to the invention of a connecting means illustrated in relation to the device of FIG. 6.

The connecting means 340 is illustrated in greater detail in FIG. 7. It essentially comprises, on the one hand, a T-shaped rod 341 with a threaded end 341a that terminates in a first transverse bar 343 and, on the other hand, a T-shaped sheath 342 that is mounted coaxially partly around the rod 341 and that terminates in a second transverse bar 344 that can be moved closer to or further away from the first bar 343 in order to tighten the belt 302. These bars 343 and 344 are intended to be locked in place against two respective turn-over regions 331a and 332a bent through an angle of 180° that the flexible band 330 has at its ends 331 and 332. The curvature of these turn-over regions 331a and 332a is designed to follow the cylindrical shape of the bars 343 and 344.

A nut 345 is mounted on the threaded end 341a against one end of the sheath 342, so as to adjust the tightening of the belt 302 by bringing the second transverse bar 343 closer to or further away from the first transverse bar 344, by screwing up or unscrewing the nut. Preferably, a nut 345 that is sufficiently resistant to being unscrewed, such as a "lock" nut of the "Nylstop" type, is used.

Preferably, this connecting means 340 further includes a tab 346 provided with a security stop 347 that extends, opposite the nut 345, from one of the ends 332 of the flexible band 330 and is designed to pass through an opening 331b in the adjacent turn-over region 331a, being elastically returned in abutment against one edge of this opening 331b, radially to the outside of the latter. The stop 347 thus prevents the belt 302 from slackening, for example should the nut 345 be accidentally unscrewed.

The devices 1 to 301 according to the invention, once they have been installed on the one-piece rim 10 and clamped around the rim well 15 via the connecting means 140 to 340, fill the well 15 so as to effectively prevent the tire from rolling off the rim. This is because each of these devices 1 to 301 prevents a circumferential region of a bead of the tire (typically the bead fitted onto the axially external rim seat 12 that is adjacent the well 15, in the case of an asymmetric rim) from sliding in this well 15 and, consequently, prevents the region diametrically opposite the previous region of the same bead from passing over the top of the rim flange 14.

It will be noted that these devices 1 to 301 according to the invention, which are formed by the belt 2 to 302 and by the single connecting means 140 to 340 fastened to the latter, consist of a single, lightweight and flexible piece of relatively simple structure that can be easily and quickly fitted into the rim well 15.

The invention claimed is:

1. Device (1, 101, 201, 301) designed to be fitted into a well (15) of a one-piece wheel rim (10) so as to prevent a tire fitted onto said rim from rolling off this rim, said device comprising a belt (2, 102, 202, 302) having two ends (131, 132 or 331, 332) and a connecting means (140, 340) for connecting said ends together, which means is intended to clamp said belt of annular shape around said well, characterized in that said belt includes a plurality of filling elements (20, 120, 220, 320) between said ends, which are designed to at least partly fill said well, at least three filling elements being circumferentially spaced apart from one another and being connected together by at least one flexible linking element (30, 130, 230, 330), which extends over the entire perimeter of said belt and terminates at said two ends, said at least one linking element forming at least two spaced apart ring sectors between adjacent filling elements.

2. Device (1) according to claim 1, characterized in that said at least one flexible linking element (30) comprises a substantially inextensible textile and/or metal cable.

3. Device (1) according to claim 2, characterized in that each of said filling elements is fastened to said at least one flexible linking element by a crimping fastening or nut and bolt fastening.

4. Device (1) according to claim 2, characterized in that said connecting means comprises two catching blocks in which the two respective ends or groups of ends facing said cable or cables (30) are fastened, which catching blocks are joined together by a bolt that passes through them, the degree of tensioning of said device being regulated by a nut fitted onto said bolt against one of said blocks.

5. Device (101, 201, 301) according to claim 1, characterized in that said at least one flexible linking element (130, 230, 330) comprises a metal band, which can be deformed in a radial direction.

6. Device (101) according to claim 5, characterized in that each of said filling elements is fastened to said at least one flexible linking element by a crimping fastening or a nut and bolt fastening.

7. Device (201) according to claim 5, characterized in that said filling elements (220) are respectively attached by transversely guiding them in upper slideways (222) that are formed on supports (221) that are integral with said flexible band (230), so as to adjust the filling of said well (15) both in its width and depth directions.

8. Device (201) according to claim 7, characterized in that each upper slideway (222) has a back-tapered trapezoidal cross section.

9. Device (201) according to claim 7, characterized in that said belt (202) includes a plurality of bases (223) which are respectively attached beneath said supports (221) that receive said filling elements (220) and which are designed to be fitted into the bottom (18) of said rim well (15) so as to adjust the radial height of said belt in said well.

10. Device (201) according to claim 9, characterized in that each of said bases (223) is attached beneath said corresponding support (221) by being transversely guided in lower slideways formed in said support.

11. Device (201) according to claim 10, characterized in that each filling element (220) and each corresponding base (223) are both provided with positioning and retaining means (224 and 225) that cooperate with said corresponding support (221) so as to position and retain said filling element and said base on and beneath said support, respectively.

12. Device (301) according to claim 7, characterized in that said belt (302) includes several U-sections (321), spaced apart between said ends (331 and 332), which sections form said respective supports and each have a web (321a) fastened beneath said flexible band (330) and two machined flanges (321b and 321c) that face each other, so as to define said slideways (322).

13. Device (301) according to claim 5, characterized in that said connecting means (340) comprises a T-shaped rod (341) with a threaded end (341a), which terminates in a first transverse bar (343), and a T-shaped sheath (342) that is mounted coaxially around said rod and terminates in a second transverse bar (344) designed to be at an adjustable distance from said first bar in order to tighten said belt (302), said bars (343 and 344) being designed to be respectively locked against two turn-over regions (331a and 332a) of said flexible band (330) that form said ends (331 and 332) of said belt (302).

14. Device (301) according to claim 13, characterized in that said clamping element (345) comprises a lock nut mounted on said threaded end (341a) of said rod (341), against one end of said sheath (342).

15. Device (301) according to claim 13, characterized in that said connecting means (340) further includes a tab (346) provided with a security stop (347) that extends from one of the ends (332) of said flexible band (330) and is designed to pass through an opening (331b) in said adjacent turn-over region (331a) being elastically returned in abutment against one edge of said opening.

16. Device (101) according to claim 5, characterized in that said connecting means (140) includes a transverse finger (141) that is designed to be locked reversibly onto a stop catch (142) in the form of a bent-over tab covering said band (130) at one of said ends (131) of said belt (102) and that binds together two arms (145 and 146) mounted so as to pivot on a fixed transverse pivot pin (144), which pin is integral with said band on the other end (132) of said belt, said connecting means further including a control lever (143) mounted so as to pivot on a movable transverse pivot pin (147) which is off-center relative to said fixed pin, in such a way that said belt is tightened or slackened, respectively, by moving said movable pin further away from or closer to said finger when pivoting said lever.

17. Device (1, 101, 201, 301) according to claim 1, characterized in that each of said filling elements (20, 120, 220, 320) is penetrated by said at least one flexible linking element (30, 130, 230, 330) and is fastened to the latter.

18. Device (1, 101, 201, 301) according to claim 1, characterized in that said filling elements (20, 120, 220, 330) are each made of a plastic.

19. Fitted assembly for a motor vehicle, comprising a one-piece wheel rim (10), a tire having two beads fitted respectively onto two axially internal and external seats (11 and 12) of said rim, and a device (1, 101, 201, 301) fitted into a well (15) in said rim so as to prevent said tire from rolling off said rim, characterized in that said device is as defined in claim 1.

20. Fitted assembly according to claim 19, characterized in that said rim (10) is of asymmetric type, said rim well (15) being adjacent said axially external seat (12).

21. Fitted assembly according to claim 19, characterized in that said axially external seat (12) is bounded axially by an external flange (14) of said rim (10) and by a circumferential hump (16) that extends radially outward and is extended axially and radially inward by an axially external edge (19) of said rim well (15), said hump being designed to prevent said bead fitted onto said axially external seat (12) from sliding in said well.

22. Device according to claim 1, wherein each of the at least three filling elements has lateral and radial edges (21 and 22), and further wherein said at least two spaced apart ring sectors pass centrally through said adjacent filling elements substantially at an equal distance from the lateral and radial edges.

* * * * *